(12) United States Patent
Dickson (10) Patent No.: US 6,257,361 B1
(45) Date of Patent: *Jul. 10, 2001

(54) HIGH CLEARANCE TRUCK CONVERTER

(75) Inventor: Spencer D. Dickson, Killarney (CA)

(73) Assignee: Hytrux Ltd., Killarney (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/425,001

(22) Filed: Oct. 25, 1999

Related U.S. Application Data (63) Continuation-in-part of application No. 08/904,648, filed on Aug. 1, 1997, now Pat. No. 6,021,861.

(30) Foreign Application Priority Data

Jul. 18, 1997 (CA) .................................................. 2210906

(51) Int. Cl.$^7$ ....................................................... B60P 3/06

(52) U.S. Cl. .................................... 180/198; 280/124.111

(58) Field of Search ................................... 280/104, 781, 280/785, 124.11, 124.111, 93.504; 180/311, 198

(56) References Cited

U.S. PATENT DOCUMENTS

| | | | | |
|---|---|---|---|---|
| 1,356,474 | * | 10/1920 | Schofield | 180/198 |
| 3,306,175 | * | 2/1967 | Ferwerda | 180/198 |
| 3,584,892 | * | 6/1971 | Moore | 280/104 |
| 4,289,214 | * | 9/1981 | Spence | 280/781 |
| 4,749,206 | * | 6/1988 | Delery et al. | 280/104 |
| 4,988,115 | * | 1/1991 | Steinke | 280/781 |
| 5,039,129 | * | 8/1991 | Balmer | 280/785 |
| 5,072,805 | * | 12/1991 | Meiners | 180/198 |
| 5,129,477 | * | 7/1992 | Hurlburt | 280/93.504 |
| 5,597,172 | * | 1/1997 | Maiwald et al. | 280/124.11 |
| 6,021,861 | * | 2/2000 | Dickson | 180/198 |

* cited by examiner

Primary Examiner—Robert P. Olszewski
Assistant Examiner—Lynda Jasmin
(74) Attorney, Agent, or Firm—Adrian D. Battison (57) ABSTRACT

A high clearance converter is used for converting a road vehicle, e.g. a pickup truck, to a high clearance vehicle, for example for agricultural use. The converter has front and rear frame components, each with two upright and ground wheels mounted on each of the legs. The front wheel hubs are mounted on the front frame component and the rear axle is mounted on the rear frame component. The front and rear frame components are coupled for relative rolling movement with respect to one another, allowing the frame to flex when travelling over uneven ground.

13 Claims, 7 Drawing Sheets

HIGH CLEARANCE TRUCK CONVERTER

CROSS REFERENCE TO RELATED APPLICATION

This application is a continuation in part of application ser. No. 08/904,648, filed Aug. 1, 1997, now U.S. Pat. No. 6,021,861.

FIELD OF THE INVENTION

The present invention relates to a high clearance converter for converting a road vehicle, e.g. a pickup truck, to a high clearance vehicle, for example for agricultural use.

BACKGROUND

High clearance sprayers are becoming increasing popular for agricultural spraying. These units are quite expensive and have a limited utility so that for much of the year a large investment remains idle.

To address this problem, it has been proposed to use a high lift vehicle frame for raising road vehicles to a height suitable for use as a high clearance sprayer. One such proposal is disclosed in Meiners U.S. Pat. No. 5,072,805, issued Dec. 17, 1991.

The frame disclosed in the Meiners patent is a rigid frame on which a pickup truck rests with its road tires. The front tires fit into rotatable sockets linked to wheel carrying front legs on the frame for steering purposes. The rear tires rest on rollers, which are connected to rear drive wheels carried on rear legs of the frame. In the preferred embodiment, the truck frame is fastened to the frame by a single hold-down anchor. A second embodiment uses a more positive drive with gear boxes and drive shafts to drive the rear frame wheels from the rear vehicle wheels. With this system, the rigid frame will not allow the ground wheels of the converter to follow uneven ground contours, making both driving and steering problematic on an uneven surface.

The present invention relates to certain improvements in converters of this type.

SUMMARY

According to the present invention there is provided In combination a high clearance converter and a vehicle having a body, two front wheel assemblies, two rear wheel assemblies and a resilient suspension supporting the body on the wheel assemblies, the converter comprising:

a front frame component with two upright front legs;

two ground wheels mounted on the respective front legs;

front vehicle mounts mounting the front wheel assemblies of the vehicle on the front frame component;

a rear frame component with two upright rear legs;

two ground wheels mounted on the respective rear legs;

rear vehicle mounts mounting the rear wheel assemblies of the vehicle on the rear frame component; and flexible couplings coupling the front and rear frame components for relative rolling movement with respect to one another.

The term "wheel assemblies" is intended as a general term to mean the components of the vehicle that are not supported directly or indirectly on the suspension springs, including wheel hubs and axles.

The use of two frame components coupled to roll with respect to one another, and mounting of the two frame components on the unsprung wheel assemblies allows the vehicle's suspension to accommodate the uneven ground conditions that may be expected on an agricultural field.

The front and rear frame components preferably include front and rear transverse beams and respective laterally spaced longitudinal side rails. The side rail of the front component is coupled to the rear component by a flexible coupling, which may be a ball joint or a rubber joint at the rear, while the side rail of the rear component is coupled to the front component by a flexible coupling at the front.

With a rigid axle, for example a solid rear drive axle, the axle may be mounted directly on the frame transverse beam with axle mounting brackets. This leaves the wheel hubs free for connection to drive connections to the frame drive wheels. These drive connections are, in the preferred embodiment, chain drives inside the frame legs, with the legs serving as chain cases.

For independent suspension systems, the mounts are designed to accommodate realignment of the vehicle wheels as they travel on the suspension from the neutral position. This may be achieved with resilient mounts for the mounting brackets.

Non-driving wheel hubs are preferably mounted on the frame transverse members by brackets that connect to the hubs using the conventional wheel lugs.

Steering wheels at the front of the frame may be connected by a tie rod and coupled to the Pitman arm of the vehicle steering box by a drag link. Thus, the front steering wheels of the vehicle are locked up and the vehicle steering system operates directly on the frame wheels.

The frame can be modified for four wheel drive using drive from the steering hubs by including constant velocity (CV) joints in the drive linking the vehicle wheel hubs and the front steering wheels of the converter frame. The frame to wheel assembly mounts will then connect the frame component to non-rotating parts of the wheel assemblies.

The frame may be made to suit vehicles with a range of wheel bases and tracks. A single adjustable length frame with laterally adjustable hub mounts and axle mounts may be used to achieve this objective.

The frame may be equipped with running board brackets and running boards that may be removed and used as ramps at the back end of the frame for loading or unloading the vehicle.

BRIEF DESCRIPTION OF THE DRAWINGS

In the accompanying drawings, which illustrate exemplary embodiments of the present invention.

DETAILED DESCRIPTION

Referring to the accompanying drawings, there is illustrated a vehicle converter 10 including a frame 12 for supporting a vehicle above the ground. The frame includes two upright front legs 14 and two upright rear legs 16 with a ground wheel 18 mounted at the bottom end of each leg.

Figure 1:
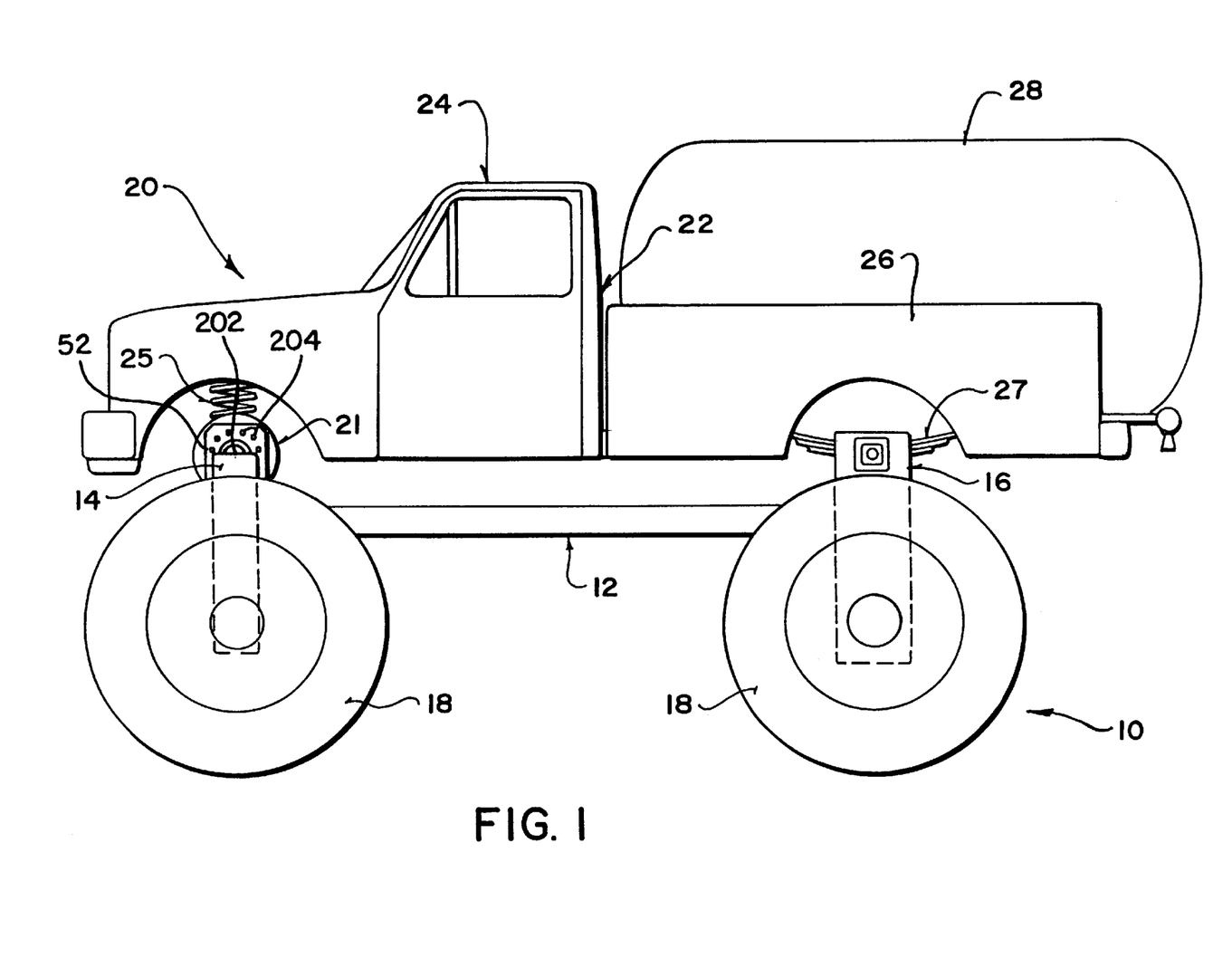
FIG. 1 is a side elevation of a converter according to the present invention carrying a truck.
Figures 7, 8:
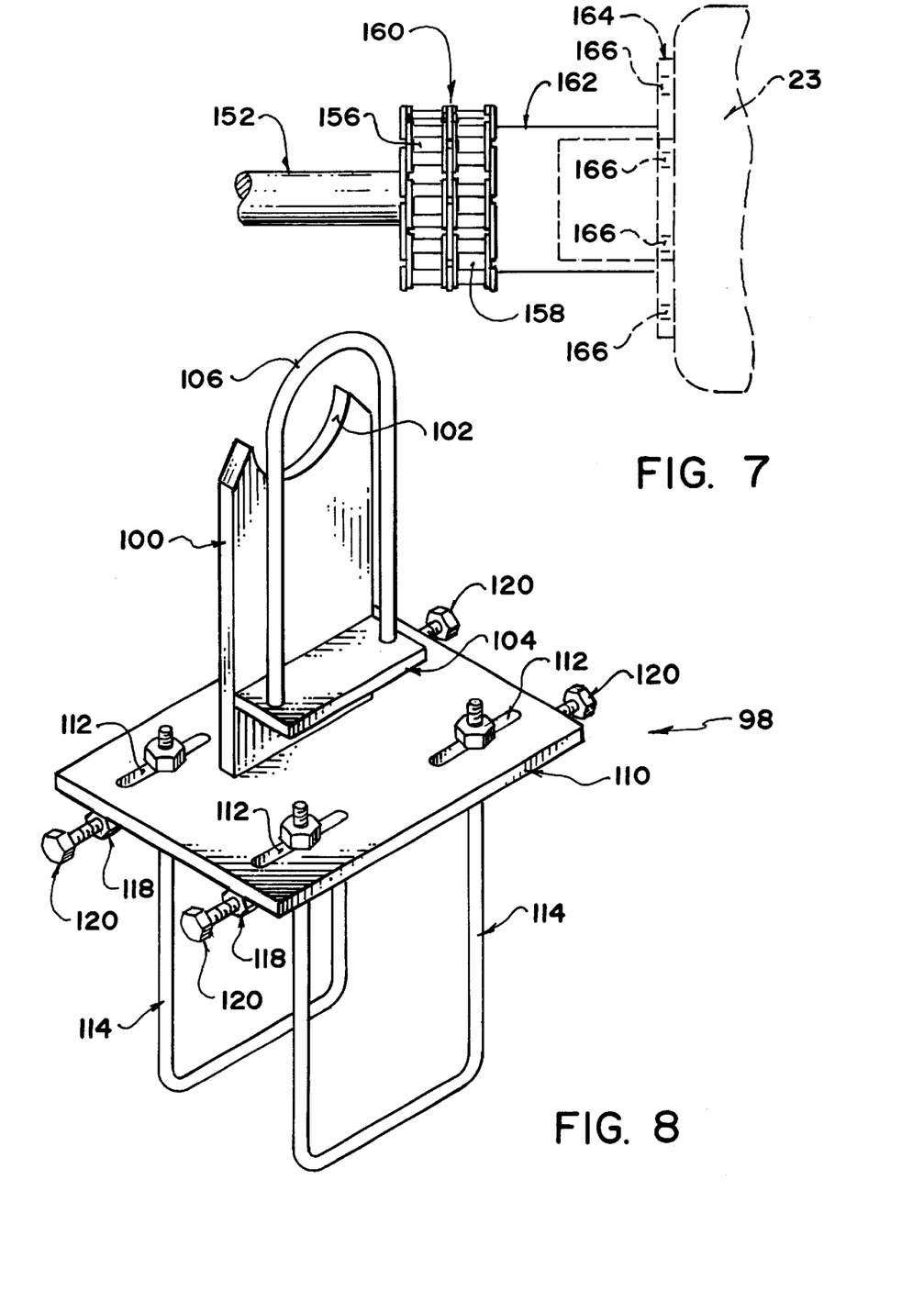
FIG. 7 is a rear view of a rear hub drive coupling.
FIG. 8 is an isometric view of a rear axle bracket.

As shown in FIG. 1, the frame is supporting a pickup truck 20 with a truck body 22 including a cab 24 and a truck box 26 carrying a field sprayer 28. The truck is conventional, with front wheel assemblies 21 and rear wheel assemblies 23 (FIG. 7) and a resilient suspension including front springs 25 and rear springs 27 for supporting the truck body on the wheel assemblies. Further elements of the truck will be discussed in the following in connection with their interaction with the converter.

Figure 4:
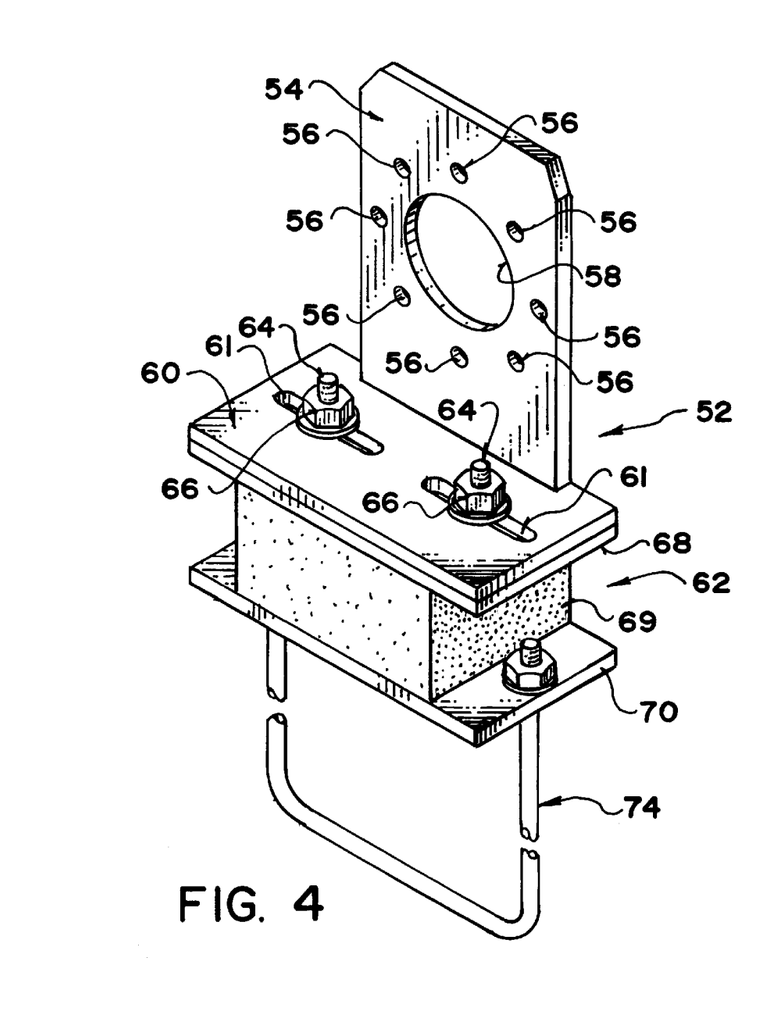
FIG. 4 is an isometric of a front hub bracket.
Figure 5:
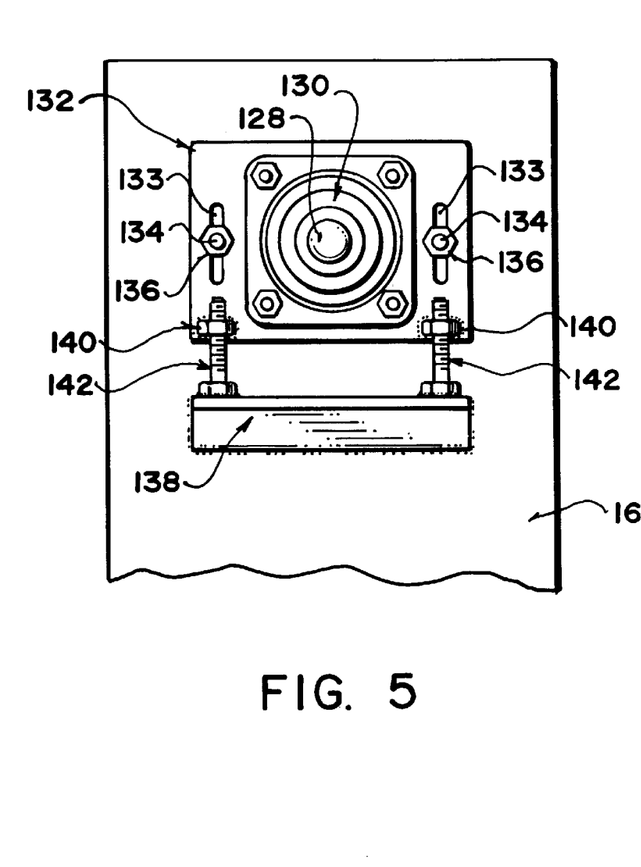
FIG. 5 is a partial side elevation of a rear leg.
Figure 6:
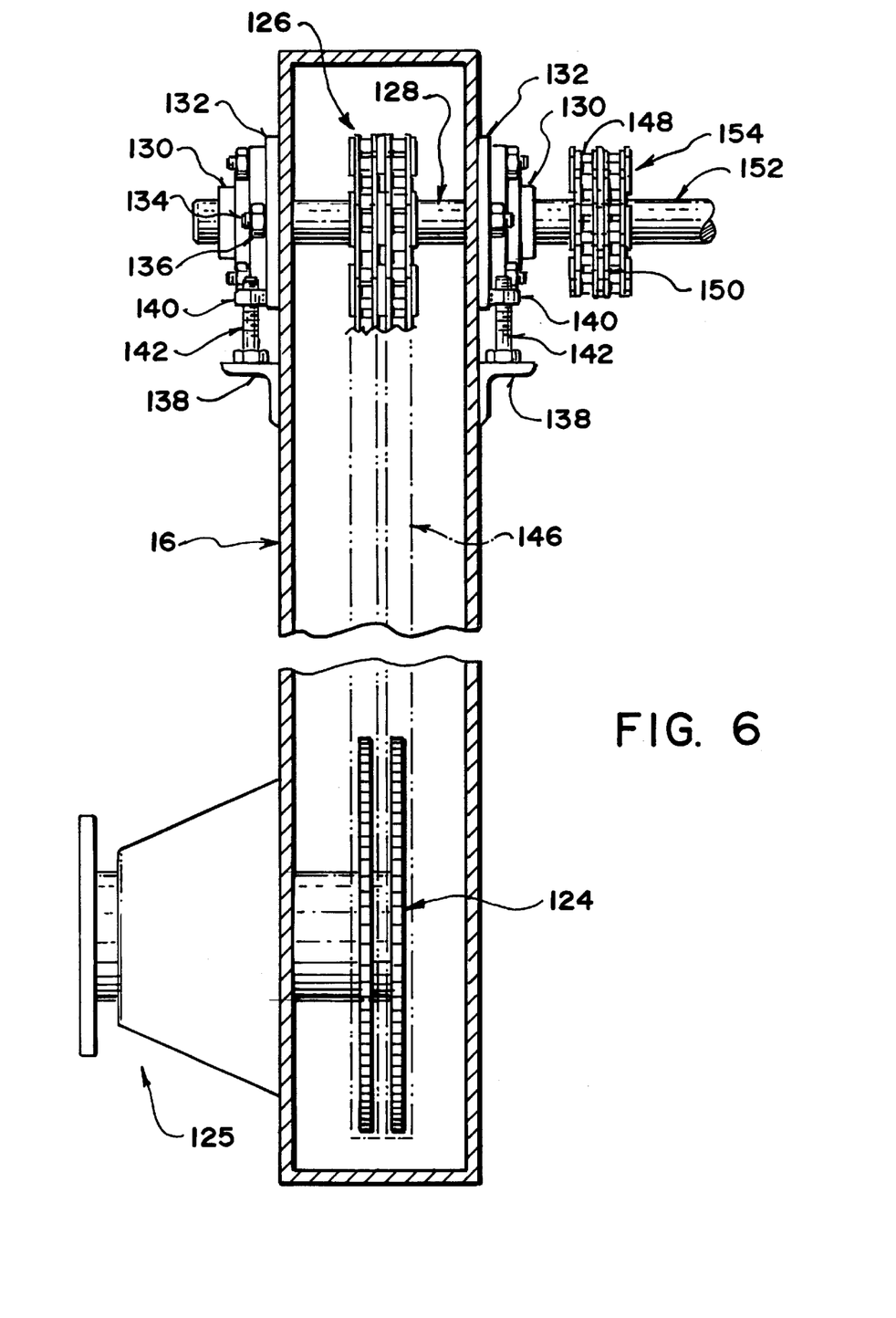
FIG. 6 is a transverse cross section of a rear leg.

The frame includes a front frame component 30 including a transverse front beam 32 and a longitudinal side rail 34 projecting to the rear from adjacent one end of the transverse beam. An angle brace 36 joins the beam 32 and the side rail 34 to provide a rigid sub-frame that will resist the anticipated loadings. Mounted on each end of the transverse beam 32 is a kingpin sleeve 38, inclined inwardly to the top as illustrated most particularly in FIG. 4. The sleeve carries kingpin bushings 39 and a kingpin 40 that is held in place in the sleeve using clamps 42 at the top and bottom of the sleeve. The clamps are mounted on an inclined upper end of a respective one of front legs 14 so that the leg will pivot about the inclined kingpin axis.

Each of the front legs has a forwardly projecting steering arm 44. A tie rod 46 extends between the two steering arms 44 and is connected to them by tie rod ends 48 so that the two front legs will pivot together for steering purposes. A drag link 50 is connected to one of the steering arms 44 for transmitting steering movements to the two front legs and the front frame wheels.

The front transverse beam 32 carries two front vehicle mounts, in the form of wheel hub mounting brackets 52. Each bracket includes a vertical flange 54 with a circle of bolt holes 56 surrounding a hub aperture 58. The flange is mounted on a base flange 60 which has a pair of longitudinal mounting slots 61. The base flange is adjustably mounted on a rubber mounts 62 by studs 64 through the respective slots 61, and nuts 66. The rubber mount has the two studs 64 projecting from a top plate 68 bonded to one side of a rubber block 69. A plate 70 bonded to the opposite side of the rubber block has bolt holes receiving the ends of a U-bolt 74, which clamps the plate 70 on the transverse beam 32.

Figure 2:
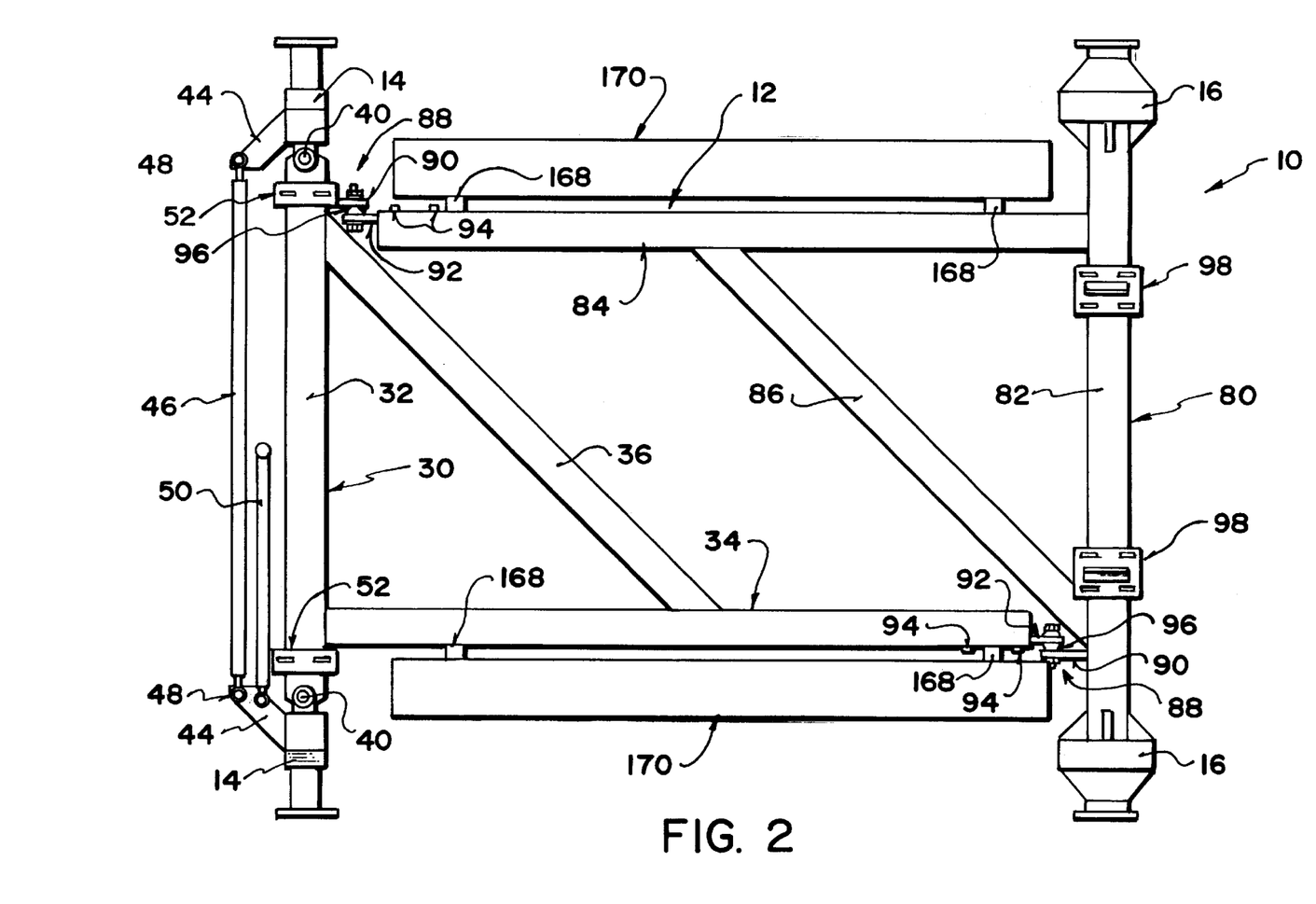
FIG. 2 is a plan view of the converter of FIG. 1.
Figure 3:
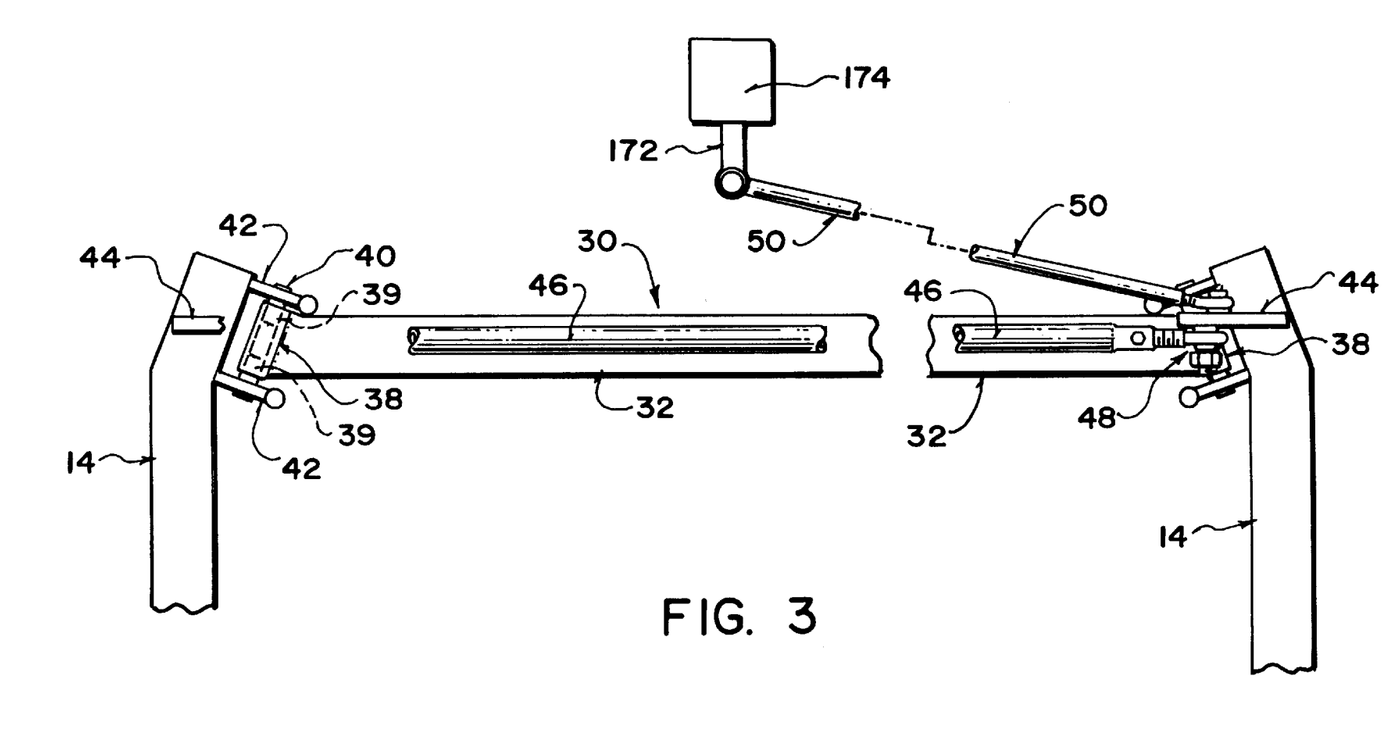
FIG. 3 is a partial front elevation, partly broken away.

The frame also includes a rear frame component 80 including a transverse rear beam 82 and a longitudinal side rail 84 coupled by an angle brace 86. As illustrated most particularly in FIG. 2, the longitudinal side rail of each frame component is coupled to the transverse beam of the other side component using a coupling 88. Each coupling includes a bracket 90 secured to the transverse beam. A second bracket 92 projects from the end of the longitudinal side rail. It is mounted on the rail by bolts 94. The bracket 92 has multiple bolt holes, allowing adjustment of the length of the side rails to accommodate vehicles with different wheel bases. The end of the bracket 92 is connected to a ball joint 96 mounted on the bracket 90.

The rear beam 82 carries two rear vehicle mounts, in the form of axle brackets 98. Each of these includes a support plate 100 with a notch 102 at the top to support the axle tube of the truck's rear axle. A flange 104 projects from one side of the support plate and is bored to receive the ends of a U-bolt 106 over the axle tube. Nuts (not illustrated) hold the U-bolt on the axle, and hold the axle firmly in place on the support plate 100. The support plate is mounted on a base plate 110 with two pairs of longitudinal slots 112 on opposite sides of the support plate. These slots receive the ends of U-bolts 114 for clamping the bracket to the beam 82 at the desired location. The slots 112 provide for longitudinal adjustment of the axle support 98 on the rear frame component. To fix the adjusted position of the axle, four nuts 118 are fixed to the base plate 110 in alignment with the U-bolts 114. Adjustment bolts 120 threaded into the nuts engage the U-bolts and fix their positions along the slots 112.

The rear legs 16 are mounted on opposite ends of the rear beam 82. Each carries, near its bottom end and inside the leg, a chain sprocket 124 connected to a wheel hub 125 for one of the rear drive wheels 18 of the converter. A second sprocket 126 is located inside the leg adjacent the top. It is mounted on a transverse shaft 128 mounted in two bearings 130. The bearings are carried by mounting plates 132 with vertical slots 133 to receive studs 134 on the rear leg. The bearings are fixed in place using nuts 136 on the studs.

To provide for vertical adjustment of the bearings, an angle 138 is fixed to the leg below each bearing. Nuts 140 are fixed to the mounting plate 132 and vertical adjustment bolts 142 are threaded into the nuts to engage the angle 138. The bolts adjust the vertical position of the shaft 128.

A chain 146 extends around the sprockets 124 and 126 so that the rear wheels of the converter frame can be driven by the shafts 128.

The inner end of shaft 128 is secured to a sprocket 148. A second sprocket 150 of the same configuration is arranged face-to-face with the sprocket 148. The second sprocket 150 is mounted on the end of a shaft 152. The sprockets are joined face to face by a circumferential double chain 154. On the inner end of the shaft 152 is a further sprocket 156 coupled to a sprocket 158 by a second double chain coupling 160. The sprocket 158 carries a sleeve 162 that extends over the projecting wheel hub of the truck. A flange 164 around the inner end of the sleeve has a circle of bolt holes 166 to be coupled to the drive wheel hub by the wheel lugs.

The two longitudinal side rails 34 and 84 carry running board brackets 168 that project laterally from the rails. Running boards 170 are mounted on these brackets to provide for more convenient access to the cab and box of the truck. The running boards are removable from the brackets 168 and can be coupled to the rear beam 82 to provide a ramp for driving the truck on to or off of the frame.

The mounting of the truck on the frame is a relatively simple job that can be accomplished in only a few minutes. The truck is first driven onto the top of the assembled converter using ramps or planks and its wheels removed. The frame is then coupled to the rear axle using the axle brackets and to the front wheel hubs 202 of the vehicle directly using the front hub brackets 52 and the existing wheel lugs 204 of the vehicle as shown in FIG. 1. The slotted front of mounting brackets 52 and the adjustable axle brackets 98 allow the alignment of the truck rear axle with the shaft 128. The rear drive adapters, including the sleeves 162 and flanges 164 are then installed using the rear wheel hub lugs. The shaft 152 is coupled between the hub adapter and the shaft 128 using the double chain couplings. The steering is then connected by disengaging the drag link of the truck's steering from the Pitman arm 172 of the truck steering box 174 and connecting the converter drag link 50 to the Pitman arm to provide direct steering from the truck steering box to the front steering wheels of the converter.

Figure 9:
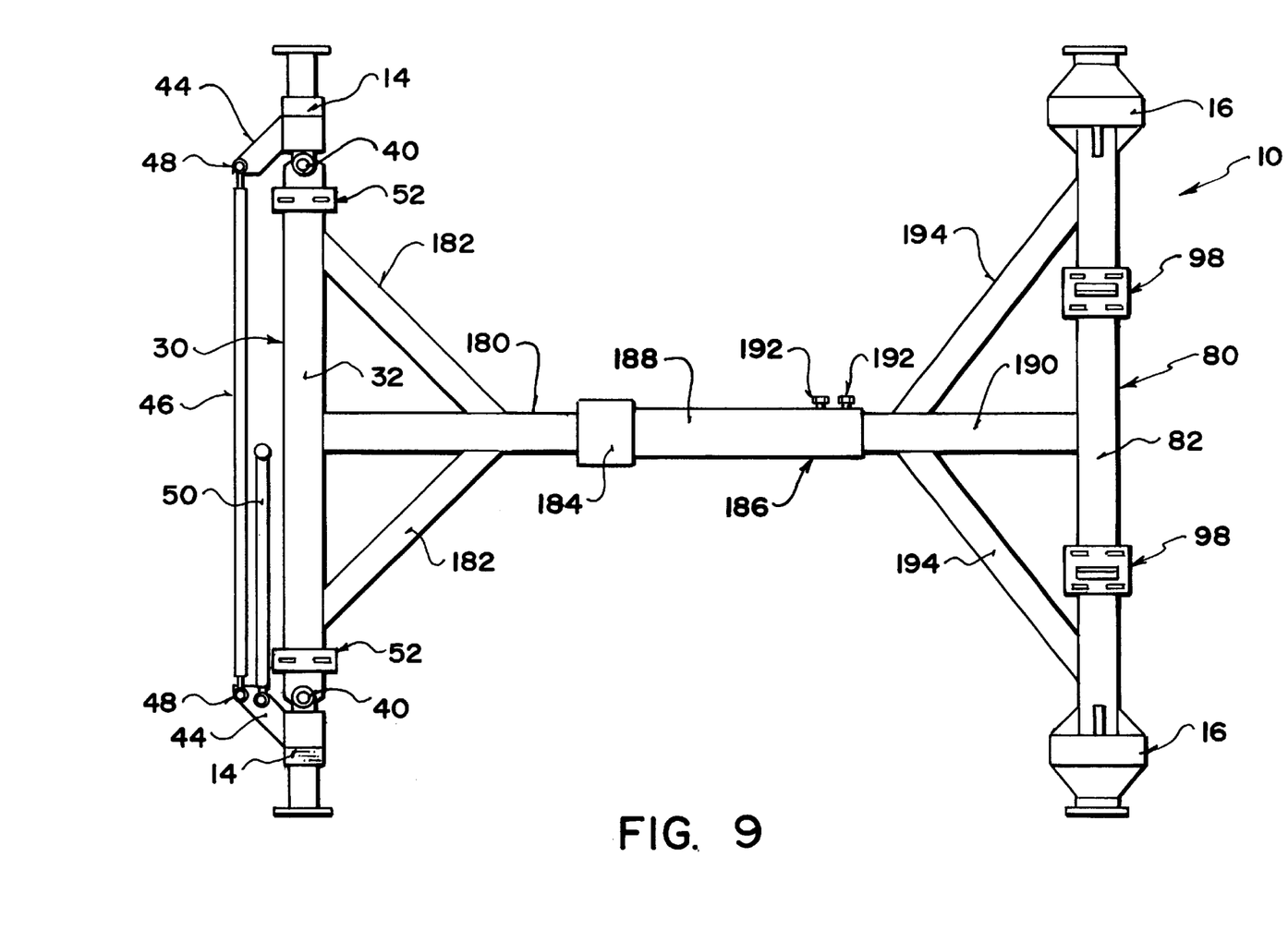
FIG. 9 is a plan view of an alternative embodiment of the converter.

An alternative embodiment of the invention is illustrated in FIG. 9. In that embodiment, the front beam 32 is connected to a front longitudinal member 180 extending to the rear from the centre of the front beam. Angle braces 182 extend between the front longitudinal member and the front beam. At the rear end of the front longitudinal member is a rotary coupling 184 connecting the front longitudinal member to the front end of a rear longitudinal member 186. The rear longitudinal member extends to the centre of the transverse rear beam 82 where it is fixed in place. The rear longitudinal member 186 is telescopic, with an outer front component 188 fixed to the rotary coupling and an inner rear component 190 that slides along the inside of the front component. The two are fastened in an adjusted position by bolts 192. Angle braces 194 extend between the inner rear component 190 and the transverse rear beam 82.

In the second embodiment, the rotary coupling serves to provide the relative rolling movement of the transverse front and rear beams 32 and 82 respectively, allowing the converter to follow ground irregularities.

The converter provides a robust support for the vehicle to be carried. Because of the flexibility of the support, it allows the suspension of the truck to flex when travelling over rough terrain to accommodate unevenness in the terrain.

While one embodiment of the present invention has been described in the foregoing, it is to be understood that other embodiments are possible within the scope of the invention and are intended to be included herein.

What is claimed is:

1. In combination with a vehicle having:
   a body;
   two front wheel assemblies and two rear wheel assemblies, the front and rear wheel assemblies being arranged for mounting respective wheels of the vehicle thereon;
   and a resilient suspension supporting the body on the wheel assemblies such that the wheel assemblies are movable with the resilient suspension of the vehicle for respective upward and downward deflections in relation to the body of the vehicle;
   a high clearance conversion kit comprising:
      a front frame component with two upright front legs;
      two ground wheels, each mounted on a respective one of the front legs;
      front vehicle mounts mounting the front wheel assemblies of the vehicle on the front frame component such that the front frame component is movable together with the respective upward and downward deflections of the front wheel assemblies in relation to the body of the vehicle and the resilient suspension supports the body of the vehicle on the front frame component:
      a rear frame component with two upright rear legs;
      two ground wheels, each mounted on a respective one of the rear legs;
      rear vehicle mounts mounting the rear wheel assemblies of the vehicle on the rear frame component such that the rear frame component is movable together with the respective upward and downward deflections of the rear wheel assemblies in relation to the body of the vehicle and the resilient suspension supports the body of the vehicle on the rear frame component; and
      flexible couplings coupling the front and rear frame components for relative rolling movement with respect to one another.

2. The combination according to claim 1 wherein the front and rear frame components comprise respective front and rear transverse beams that are longitudinally spaced apart and respective front and rear longitudinal rails that are transversely spaced apart.

3. The combination according to claim 2 wherein the flexible couplings connect a rear end of the front longitudinal rail to the rear transverse beam and a front end of the rear longitudinal rail to the front transverse beam.

4. The combination according to claim 3 wherein each front wheel assembly comprises a front wheel hub and the front vehicle mounts comprise brackets mounted on the front transverse beam and mounted directly on the front wheel hubs to secure the hubs immovably to the front transverse beam.

5. The combination according to claim 4 including means resiliently mounting the front brackets on the front beam.

6. The combination according to claim 2 wherein the rear wheel assemblies include a transverse axle and the rear vehicle mounts comprise brackets mounted on the rear transverse beam and on the axle.

7. The combination according to claim 1 including steering means comprising kingpins mounting the front legs for pivotal movement on the front transverse beam, and a steering linkage coupling the front legs.

8. The combination according to claim 7 wherein the steering linkage includes steering arms mounted on the front legs and a tie rod joining the steering arms.

9. The combination according to claim 8 wherein the vehicle includes a steering box with a Pitman arm and the steering linkage further comprises a drag link connected to the Pitman arm of the vehicle steering box.

10. The combination according to claim 1 wherein the vehicle includes drive wheel assemblies comprising at least the front wheel assemblies or the rear wheel assemblies and the converter includes drive means coupling the drive wheel assemblies to respective ones of the ground wheels of the converter.

11. The combination according to claim 10 wherein the drive wheel assemblies include drive wheel hubs and the drive means include drive transmission means engaged with the respective drive wheel hubs and coupled to respective ones of the ground wheels for driving the ground wheels.

12. In combination with a vehicle having:
    a body;
    two front wheel assemblies and two rear wheel assemblies, the front wheel assemblies, each comprising a respective wheel hub arranged for mounting a respective wheel of the vehicle thereon;
    and a resilient suspension supporting the body on the wheel assemblies such that the wheel assemblies are movable with the resilient suspension of the vehicle for respective upward and downward deflections in relation to the body of the vehicle;
    a high clearance conversion kit comprising:
       a front frame component with two upright front legs;
       two ground wheels, each mounted on a respective one of the front legs;
       front vehicle mounts mounting the front wheel assemblies of the vehicle on the front frame component such that the front frame component is movable together with the respective upward and downward deflections of the front wheel assemblies in relation to the body of the vehicle and the resilient suspension supports the body of the vehicle on the front frame component;
       the front vehicle mounts including resilient mounts, each mounting a respective wheel hub of the front wheel assemblies of the vehicle on the front frame component permitting limited relative movement between the wheel hub and the front frame component;
       a rear frame component with two upright rear legs;
       two ground wheels, each mounted on a respective one of the rear legs;
       rear vehicle mounts mounting the rear wheel assemblies of the vehicle on the rear frame component such that the rear frame component is movable together with the respective upward and downward deflections of the rear wheel assemblies in relation to the body of the vehicle and the resilient suspension supports the body of the vehicle on the rear frame component; and flexible couplings coupling the front and rear frame components for relative rolling movement with respect to one another.

13. In combination with a vehicle having:

a body;

two front wheel assemblies and two rear wheel assemblies, the rear wheel assemblies including a transverse rear axle;

and a resilient suspension supporting the body on the wheel assemblies such that the wheel assemblies are movable with the resilient suspension of the vehicle for respective upward and downward deflections in relation to the body of the vehicle;

a high clearance conversion kit comprising:
a front frame component with two upright front legs;
two ground wheels, each mounted on a respective one of the front legs;

front vehicle mounts mounting the front wheel assemblies of the vehicle on the front frame component such that the front frame component is movable together with the respective upward and downward deflections of the front wheel assemblies in relation to the body of the vehicle and the resilient suspension supports the body of the vehicle on the front frame component;

a rear frame component with two upright rear legs;

two ground wheels, each mounted on a respective one of the rear legs;

rear vehicle mounts mounting the transverse axle of the rear wheel assemblies of the vehicle on the rear frame component such that the rear frame component is movable together with the respective upward and downward deflections of the rear wheel assemblies in relation to the body of the vehicle and the resilient suspension supports the body of the vehicle on the rear frame component; and flexible couplings coupling the front and rear frame components for relative rolling movement with respect to one another.

\* \* \* \* \*